United States Patent Office 3,237,411
Patented Mar. 1, 1966

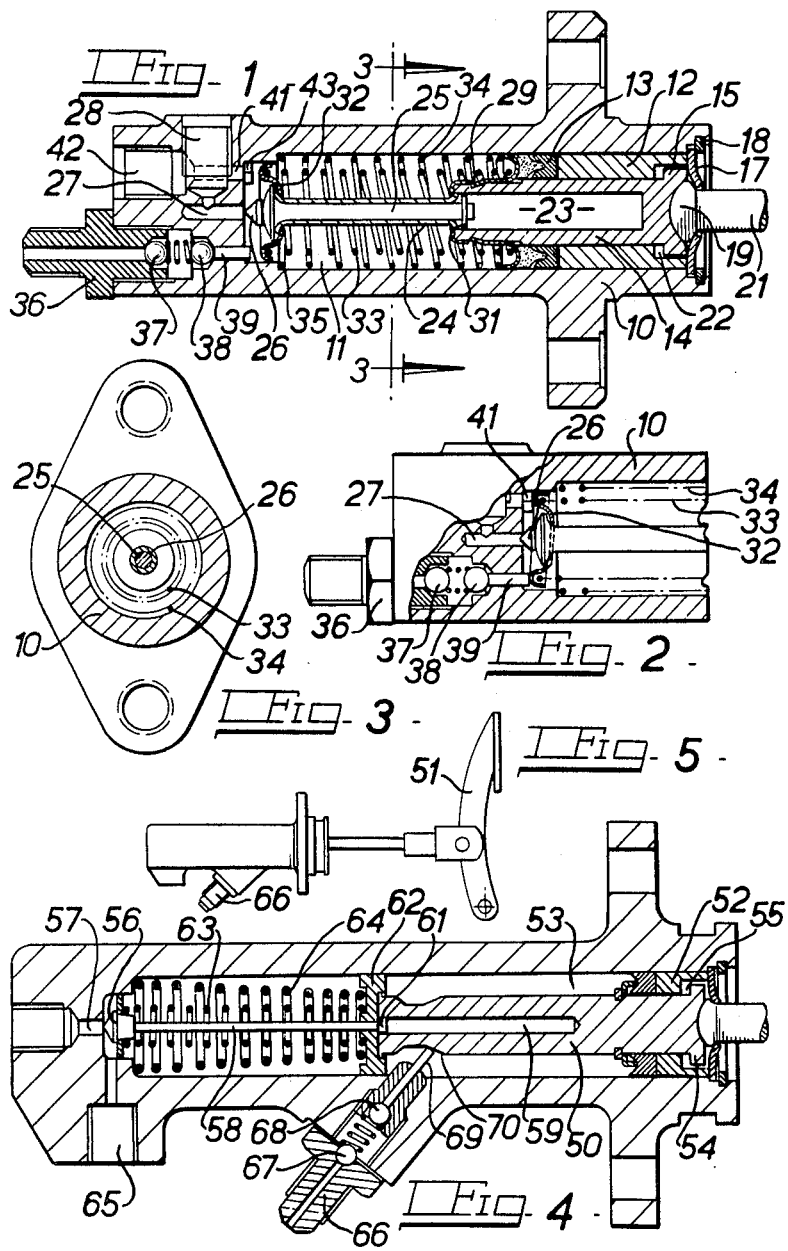

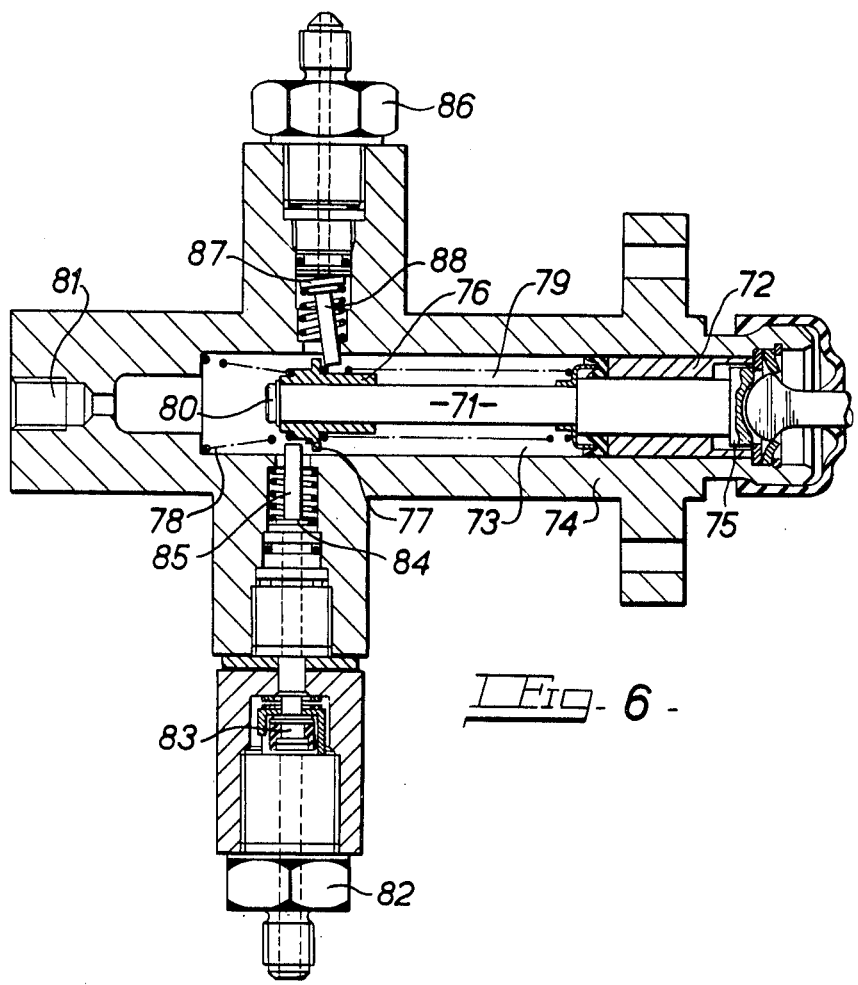

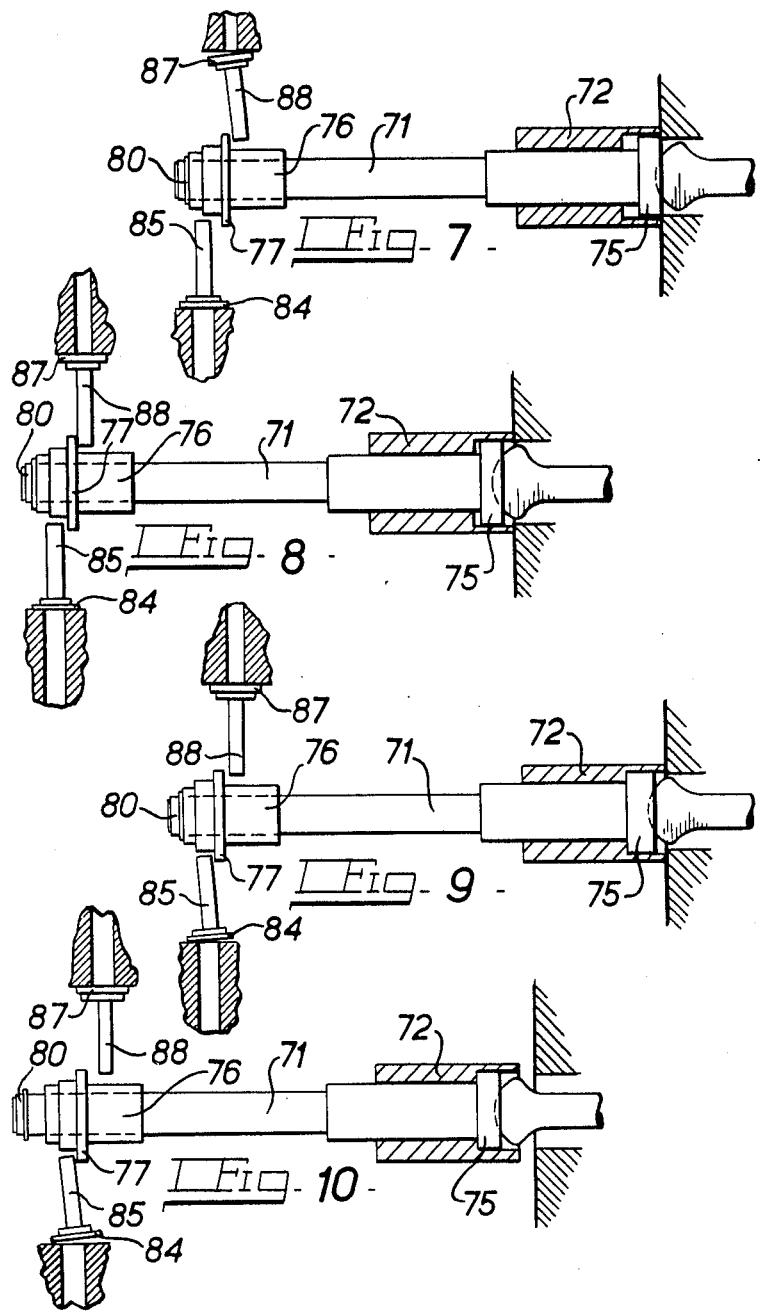

3,237,411
HYDRAULIC BRAKING SYSTEMS
Philip Augustus Taft, Solihull, England, assignor to Girling Limited, Birmingham, England, a British company
Filed Dec. 11, 1964, Ser. No. 417,583
Claims priority, application Great Britain, Dec. 13, 1963, 49,254/63
6 Claims. (Cl. 60—54.5)

This invention relates to improvements in hydraulic braking systems of the kind in which slave cylinders for applying the brakes are supplied with fluid under pressure from a pump or other source of fluid under pressure under the control of a valve actuated by a pedal or the like.

According to my invention, in an hydraulic braking system of that kind the valve is combined with a pedal-operated master cylinder and the valve controls a passage in the cylinder body through which fluid from the pressure source is admitted to a pressure space in the cylinder connected to the slave cylinder or cylinders, the valve being actuated to open the passage by axial movement of the master cylinder piston or of a rod working through it, and the piston is operable by the pedal to apply pressure to fluid in the pressure space and supply it to the slave cylinder or cylinders in the event of failure of the supply of pressure fluid.

The valve may, for example, be opened by a relatively small movement of the master cylinder piston or of a rod working through the piston which also cuts off a normally open communication between the master cylinder and a port leading to a reservoir or to exhaust, and on failure of the pressure fluid supply the master cylinder is cut off from that supply and the piston of the master cylinder can then be advanced in the ordinary way to supply fluid under pressure to the slave cylinders of the brakes.

Several forms of master cylinder embodying my invention are illustrated by way of example in the accompanying drawings in which:

FIGURE 1 is a longitudinal section of one form of master cylinder with the various parts in the positions they assume when the brake is off;

FIGURE 2 is a fragmentary section of the output end of the cylinder of FIGURE 1 with the valves in positions corresponding to normal application of the brake;

FIGURE 3 is a cross-section on the line 3—3 of FIGURE 1;

FIGURE 4 is a longitudinal section of a master cylinder incorporating a different arrangement of valves;

FIGURE 5 is an external view of the master cylinder shown in FIGURE 4 and the operating pedal;

FIGURE 6 is a longitudinal section of a master cylinder incorporating tipping valves;

FIGURES 7, 8 and 9 and 10 are diagrammatic views of the master cylinder shown in FIGURE 6 illustrating the different positions of the parts under different conditions;

In the arrangement shown in FIGURES 1 to 3, 10 is a master cylinder having a longitudinal bore 11 in which works a piston 12 provided with a seal 13. A rod 14 is axially slidable through a bore in the piston and has on its rear end an enlarged head 15 received in a counter-bored recess in the rear end of the piston. The axial length of the head 15 is less than the axial spacing between the inner end of the recess and a coned washer 17 which is retained in the rear end of the cylinder bore by a spring or circlip 18 and also forms a stop for the rearward movement of the piston and holds a boss 19 on the end of an operating rod 21 in engagement with the outer end of the rod 14. The rod 14 thus has a limited free movement, indicated by the clearance 22, relative to the piston.

In the forward end of the rod 14 there is an axial recess 23 of substantial length into which can slide the rear end of a sleeve 24 surrounding the stem 25 of an axial valve 26 of conical form controlling a passage 27 leading to a socket or union 28 connected to a replenishment reservoir. The rear end of the sleeve 24 is bell mouthed and is retained in the recess 23 by the inturned end of a clip 29 mounted on the forward end of the rod 14, and the rear end of the valve stem 25 carries a washer 31 which is a sliding fit in the recess. The forward end of the sleeve is also belled and forms a stop for a dished plate or disc 32 which is urged into engagement with the belled end of the sleeve by a compression spring 33 abutting between the plate and a radial flange in the clip 29. A second spring 34 abuts between the clip 29 and an internal shoulder 35 in the cylinder bore.

A union 36 adapted to be connected to a source of fluid under pressure is screwed into a recess in the forward end of the cylinder, and a one-way valve 37 opening rearwardly is located at the inner end of the union. A second one-way valve 38 opening forwardly is located in the recess at the forward end of a passage which leads into the forward end of the cylinder bore and in which is slidably mounted a thrust pin 39 projecting into the cylinder.

Another passage 41 in the end of the cylinder leads into an outlet 42 adapted to be connected to a brake cylinder or cylinders.

When the high pressure source is operative a small forward movement of the rod 14 moves the valve 26 axially to close the passage 27 and so cut off communication with the reservoir.

On further movement of the rod 14 the upper edge of the plate 32 engages an abutment 43 on the end of the cylinder and the plate pivots about this abutment under the action of the spring 33 so that the lower edge of the plate forces the thrust pin 39 forwardly to open the valve 38 as shown in FIGURE 2. Fluid is thus allowed to flow from the high pressure source to the slave cylinders of the brakes.

While the valve 38 is open the forward end of the rod 14 is exposed to the pressure in the cylinder, which is the pressure applied to the brake, and provides a reaction on the pedal proportional to the braking effort.

In the event of failure of the high pressure source further movement of the rod 14 takes up the clearance 22 between the head 15 and the inner end of the recess in the piston and the piston is moved forwardly with the rod 14 to force fluid from the master cylinder through the outlet 42 to the brake cylinder or cylinders. At the same time the valve 37 closes to prevent fluid being forced out of the cylinder through the inlet 36.

When the actuating pedal is released the piston is returned to its normal position by the spring 34 and the clearance 22 between the head 15 and the piston is re-established.

In the modification shown in FIGURES 4 and 5 a rod 50 actuated by a pedal 51 is axially movable through a piston 52 working in a cylinder bore 53. A head 54 on the rear end of the rod works in a recess in the rear end of the piston in which it has a limited freedom of axial movement indicated by the clearance 55. A valve head 56 adapted to co-operate with a passage 57 in the end of the cylinder leading to a reservoir has an axial stem 58 which is slidable in an axial recess 59 in the rod 50, the rear end of the stem having a head 61 for which a stop is formed by a spider 62 fixed on the forward end of the rod. A spring 63 abuts between a stop disc mounted on the valve head and the spider 62 and another spring 64 abuts between the spider and an internal shoulder in the cylinder bore.

An outlet passage 65 leading out of the cylinder bore near its forward end is connected to the slave cylinder or cylinders of the brakes. A source of fluid under pressure is connected to a union 66 screwed into a boss on the side of the cylinder with its axis inclined to the axis of the cylinder. Between the union and the cylinder bore there is a one-way valve 67 opening towards the cylinder and a one-way valve 68 opening in the opposite direction. The valve 68 is opened by a sliding pin 69 when the inner end of the pin is engaged by a step or shoulder 70 on the rod after a small forward movement of the rod in the application of the brake by the pedal.

In the construction shown in FIGURE 6 there is again a rod 71 movable by a pedal axially through a piston 72 working in a bore 73 in a body 74, the rod having on its rear end a head 75 working in a recess in the rear end of the piston and permitting a limited free movement of the rod relative to the piston.

A sleeve 76 is slidably mounted on the forward end of the rod and has a radially projecting flange 77. A compression spring 78 is arranged between the forward end of the cylinder bore and the sleeve 76 and another spring 79 is arranged between the sleeve and the forward end of the piston. These springs urge the piston and rod into their fully retracted positions in which they are shown in FIGURE 6 and the spring 79 also holds the sleeve 76 normally in engagement with a stop 80 at the forward end of the rod 71.

A passage 81 leading out of the forward end of the cylinder bore is adapted to be connected to the slave cylinder or cylinders of the brake. A union 82 adapted to be connected to a source of fluid under pressure leads through a non-return valve 83 and a spring-loaded tipping valve 84 into the cylinder bore, the stem 85 of the valve projecting into the bore forward of the flange 77 on the sleeve 76. Another union 86 adapted to be connected to a reservoir leads through a spring-loaded tipping valve 87 into the cylinder bore, the stem 88 of the valve projecting into the cylinder bore on the opposite side from the stem 85 of the valve 84.

The axes of the valves 84 and 87 are at right angles to the axis of the cylinder and are in such axial positions that in the fully retracted position of the rod 71 the flange 77 engages the stem of the valve 87 and holds the valve open as shown in FIGURES 6 and 7 while the stem of the valve 84 is spaced forwardly from the flange 77.

The cylinder bore is normally in free communication with the reservoir through the valve 87 but is cut off from the source of fluid under pressure by the valve 84.

When the rod 71 has been advanced through a short distance in the application of the brake into the position shown in FIGURE 8 the flange 77 has moved forwardly far enough to allow the valve 87 to close and cut off communication with the reservoir.

On further forward movement of the rod the flange 77 engages the stem of the valve 84 and opens that valve as shown in FIGURE 9 so that pressure fluid can flow from the pressure source into the cylinder bore and through the delivery outlet 81 to the slave cylinder or cylinders of the brake.

On release of the brake pedal the rod 71 is returned to its fully retracted position by the spring 78 so that the valve 84 closes and the valve 87 is opened.

In the event of failure of the source of pressure fluid further movement of the pedal advances the rod 71 to take up the clearance between the head 75 and the piston and then the rod takes the piston forwardly with it as shown in FIGURE 10 to displace fluid from the cylinder to the slave cylinder or cylinders of the brake. In this forward movement of the rod it slides through the sleeve 76 for which a stop is formed by the stem of the valve 84, and that valve is held open but the non-return valve 83 prevents fluid being forced back to the pressure source.

My invention provides a combined master cylinder and control for a fluid pressure braking system which is simple in construction, reliable in performance, economical to manufacture, and easy to service.

I claim:

1. A pedal-operated master cylinder for controlling the supply of fluid from a source of fluid under pressure to at least one brake-actuating slave cylinder comprising a cylinder body, a bore in said body, a piston axially movable in said bore, a pedal-operated rod axially movable through said piston, a lost-motion coupling between said rod and piston permitting a limited axial movement of the rod independently of the piston, a pressure space in the cylinder bore in front of said piston, a first passage in the cylinder body adapted to be connected to said source and opening into said pressure space, a normally closed first valve controlling said first passage, a second passage in the cylinder body adapted to be connected to a reservoir and leading into said pressure space, and a normally open second valve controlling said second passage, a small forward movement of said rod closing said second valve and opening said first valve and a greater movement of said rod taking up the lost motion between the rod and the piston and advancing the piston to apply pressure to fluid in the pressure space in the event of failure of the supply of pressure fluid, said first and second valves being spring-loaded tipping valves having stems co-operating with a member carried by and axially movable relative to said rod whereby said second valve is normally held open and on forward movement of the rod said second valve is allowed to close and said first valve is opened.

2. An hydraulic braking system incorporating a source of fluid under pressure, at least one brake actuating slave cylinder, and a pedal-operated master cylinder combined with a valve controlling the supply of fluid from said source to said slave cylinder, said master cylinder comprising a cylinder body, a piston axially movable in the cylinder bore, an imperforate pedal-operated rod axially movable through said piston, a lost-motion coupling between said rod and piston permitting a limited axial movement of the rod independently of the piston, a pressure space in the cylinder bore in front of the body, a first passage in the cylinder body adapted to be connected to said source and opening into said pressure space, a normally closed first valve controlling said first passage, a second passage in the cylinder body adapted to be connected to a reservoir and leading into said pressure space, and a normally open second valve controlling said second passage, a small forward movement of said rod closing said second valve and opening said first valve and a greater movement of said rod taking up the lost motion between the rod and the piston and advancing the piston to apply pressure to fluid in the pressure space in the event of failure of the supply of pressure fluid.

3. A pedal-operated master cylinder for controlling the supply of fluid from a source of fluid under pressure to at least one brake-actuating slave cylinder comprising a cylinder body, a piston axially movable in the cylinder bore, an imperforate pedal-operated rod axially movable through said piston, a lost-motion coupling between said rod and piston permitting a limited axial movement of the rod independently of the piston, a pressure space in the cylinder bore in front of the body, a first passage in the cylinder body adapted to be connected to said source and opening into said pressure space, a normally closed first valve controlling said first passage, a second passage in the cylinder body adapted to be connected to a reservoir and leading into said pressure space, and a normally open second valve controlling said second passage, a small forward movement of said rod closing said second valve and opening said first valve and a greater movement of said rod taking up the lost motion between the rod and the piston and advancing the piston to apply pressure to fluid in the pressure space in the event of failure of the supply of pressure fluid.

4. A pedal-operated master cylinder as in claim 3 wherein said piston and rod are sealed by a single seal through which the rod works and which co-operates with the cylinder bore.

5. A pedal-operated master cylinder for controlling the supply of fluid from a source of fluid under pressure to at least one brake-actuating slave cylinder comprising a cylinder body, a bore in said body, a piston axially movable in said bore, a pedal-operated rod axially movable through said piston, a lost-motion coupling between said rod and piston permitting a limited axial movement of the rod independently of the piston, a pressure space in the cylinder bore in front of said piston, a first passage in the cylinder body adapted to be connected to said source and opening into said pressure space, a normally closed first valve controlling said first passage, a second passage in the cylinder body adapted to be connected to a reservoir and leading into said pressure pace, and a normally open second valve controlling said second passage, a small forward movement of said rod closing said second valve and opening said first valve and a greater movement of said rod taking up lost motion between the rod and the piston and advancing the piston to apply pressure to fluid in the pressure space in the event of failure of the supply of pressure fluid, said first and second valves being spring-loaded tipping valves having stems co-operating with a flange on a sleeve slidably mounted on said rod, and the valves are spaced axially in the cylinder in such positions that normally said flange engages the stem of the second valve to hold it open and is spaced from the stem of the first valve and on forward movement of the rod said flange leaves the stem of the second valve to allow it to close and then engages the stem of the second valve to hold it open and is spaced from the stem of the first valve and on forward movement of the rod said flange leaves the stem of the second valve to allow it to close and then engages the stem of the first valve to open it.

6. A pedal-operated master cylinder as in claim 5 whereinafter said first valve has been opened and said rod can move axially through the sleeve to advance the piston.

References Cited by the Examiner

UNITED STATES PATENTS

| 1,662,096 | 3/1928 | Zelov | 60—52 X |
| 2,170,593 | 8/1939 | Moore | 188—152.49 |
| 2,414,675 | 1/1947 | Stelzer | 188—152.41 |
| 2,764,262 | 9/1956 | Stelzer | 60—54.5 X |
| 2,887,187 | 5/1959 | Fletcher et al. | 60—54.6 X |

FOREIGN PATENTS

| 562,144 | 6/1944 | Great Britain. |
| 797,035 | 6/1958 | Great Britain. |

SAMUEL LEVINE, *Primary Examiner*.

ROBERT R. BUNEVICH, *Examiner*.